Oct. 21, 1930. T. S. HUTCHISON 1,779,096
MINIATURE MOTOR CAR
Filed Feb. 9, 1929
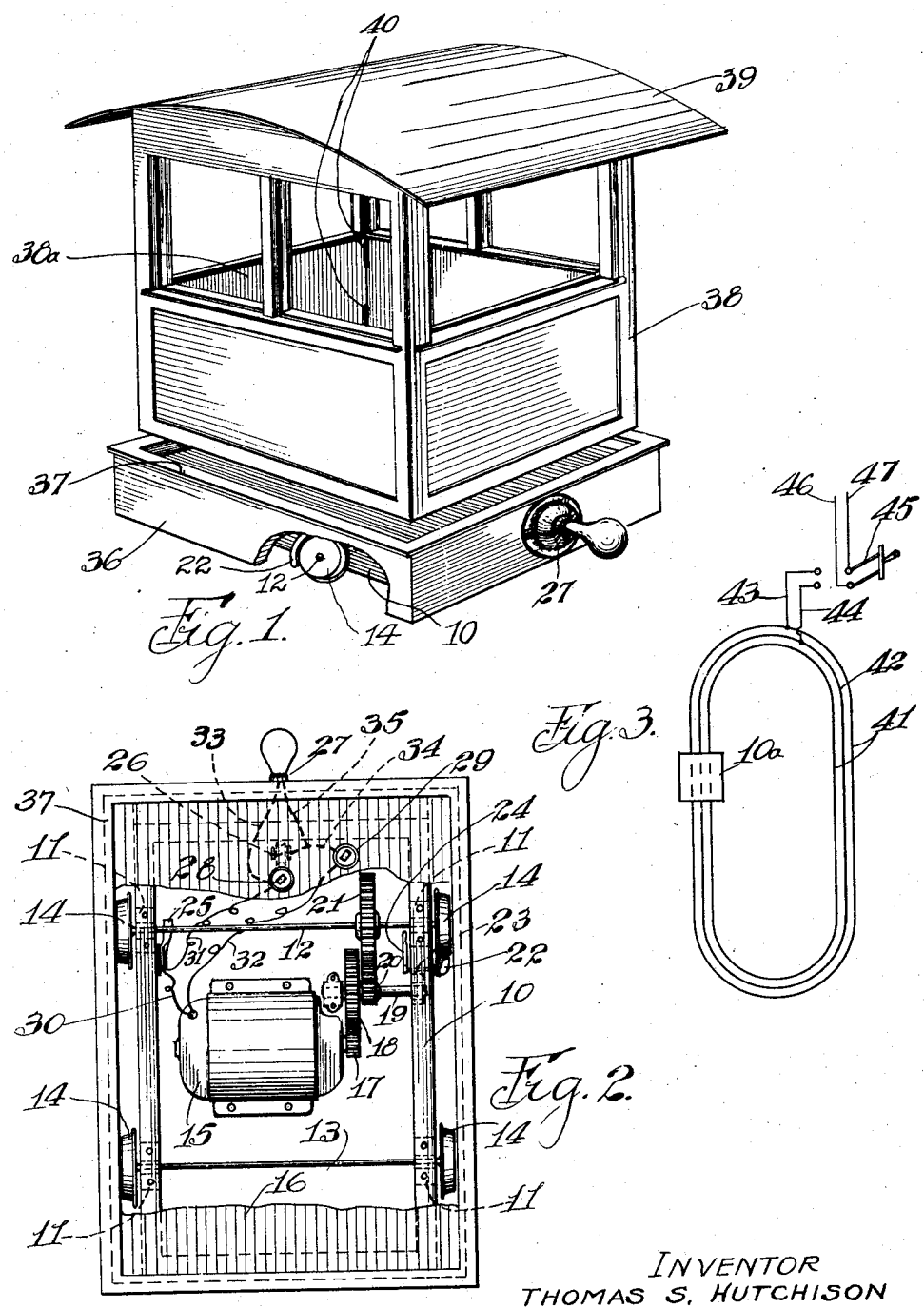
INVENTOR
THOMAS S. HUTCHISON
By Albert C. Bell
ATTORNEY.

Patented Oct. 21, 1930

1,779,096

UNITED STATES PATENT OFFICE

THOMAS S. HUTCHISON, OF CHICAGO, ILLINOIS

MINIATURE MOTOR CAR

Application filed February 9, 1929. Serial No. 338,779.

My invention relates to a construction of miniature motor car for use by children for recreational purposes, which motor car is preferably driven by electricity and preferably of sufficient power to haul trailer cars.

In connection with recreation parks, playgrounds and even private homes in many cases, there is a considerable demand for moving devices of one kind or another for the entertainment of children and it is an object of my invention to provide a device of this kind in the form of a car having track wheels to run on rails that may extend in any desired direction and in any desired form, whether a closed track or not, according to the convenience of the location where the track is placed. The car is preferably of small size so that it may accommodate but a few children, to permit it being readily handled, in placing it on the track and removing it to shelter if desired. The track is preferably narrow gauge, for example fifteen inches and provided with a third rail of suitable type to supply current to the motor mechanism on the motor car. Suitable devices are employed to guard the third rail so that children playing around the track will not come in contact with it. Since the track construction does not constitute a part of the present invention, it is not shown and described in detail in the present application.

In constructing a motor car of the kind under consideration, it is important that the platform of the car should be near the ground, which is readily attained with a car of small size, to the end that children riding on the car will not be injured if they fall from it. A further important consideration, is that the car should be constructed to protect all of the gearing and wheels of the car and prevent grease and oil getting on the clothing of the children, and further, that means be employed to prevent the children getting in contact with the wheels or moving parts at all and thus prevent accidents. This result I accomplish by a novel construction below described. It is also desirable that a car of this kind shall be provided with a closed body that may be placed on and removed from the car platform as desired, so that the car may be used for different purposes, depending upon the fancy of the children playing with it, and that it also may be used under different weather conditions. By my invention I provide a body of the kind referred to that may be placed on the car platform and positively retained thereon without the use of fastening devices of any kind.

My invention will best be understood by reference to the accompanying drawings showing a preferred embodiment thereof, in which Fig. 1 shows the motor car in perspective top view with the body in position to be lowered upon the platform although as shown it is not resting upon the car and is slightly elevated above it, Fig. 2 is a plan view of the car with the body removed and the platform of the car partly broken away to show the operating mechanism, and Fig. 3 is a diagrammatic view illustrating the circuit connections that may be employed with the track construction.

Similar numerals refer to similar parts throughout the several views.

As shown in Fig. 2, the car consists of a rigid rectangular frame 10 which may be of wood or metal as preferred, to the lower edge of which, bearing boxes 11 are secured to support the front and rear axles 12 and 13. The axles project beyond the bearing boxes 11 and have secured to their ends, track wheels 14, which are rigidly secured to the axles in any convenient manner.

An electric motor 15, which I find may be a small motor, for example, one-quarter horsepower or one-third horsepower, is supported from the under side of the platform 16, which platform is secured to the top of the frame 10 and extended beyond the frame sufficiently to project somewhat beyond the wheels 14. The motor pinion 17 meshes with a gear 18 carried by a shaft 19 supported in suitable bearings by the frame 10 and platform 16, and in addition the shaft 19 carries a pinion 20 meshing with a gear 21 rigidly secured to the axle 12. In this manner rotation of the motor 15 drives the axle 12 and the wheels 14 attached to it, at a slow speed relatively to the speed of the motor 15. One of the wheels 14 may have mounted adjacent to it as indicated, a brake shoe 22 carried by a short shaft 23 in a suitable bearing carried by the frame 10, to the other end of which an operating handle 24 may be secured to operate the brake shoe and bring the car to a stop, the handle 24 projecting upwardly through the platform 16, so as to be conveniently available to the driver of the car.

The axle 12 is engaged by a spring contact arm 25 carried by and insulated from the frame 10, to constitute one terminal of the circuit connected with the wiring of the car. A trolley wheel 26 is carried by the underside of the platform 16 and insulated therefrom to constitute the other terminal of the wiring of the car. The front of the car may have extending therefrom a headlight 27, and switches 28 and 29 are mounted on top of the platform 16 to control the headlight 27 and motor 15 respectively. The contact spring 25 is connected by wires 30 and 31 with the motor 15 and with the switch 28 respectively. The other wire 32 extending from the motor connects with the switch 29. The other terminals of the switches 28 and 29 are connected respectively by wires 33 and 34 with the headlight 27 and the trolley wheel 26. The other terminal of the headlight 27 is connected by wire 35 with wire 34. From the connections described, when the switch 29 is closed to start the motor, a circuit connection is established between the contact spring 25 through wires 30, 32 and 34, from the main tracks and the third rail upon which the car may be resting. In this way the operation of the car is directly and in a simple manner under the control of the driver thereof. It will be noticed that no starting resistance is inserted in the operating circuit of the motor 15. This is a desirable condition for the sake of simplicity and safety from fire risk, where the car is to be handled by children. This condition is attainable only when the motor is of small size, for example, one-quarter horsepower or one-third horsepower. It will also be observed that the headlight is controlled by the switch 28 through the wires 31, 33, 35 and 34, so that it may be lighted or not as the driver of the minature car may desire.

To insure against contact with the driving gearing and mechanism of the car, in order that the clothing of the children may be protected from the oil and grease necessary to lubricate the moving parts, I provide a downwardly extending apron 36 around the outer edge of the platform 16, which has a depth vertically sufficient to bring it down nearly to the plane of the tread surfaces of the track wheels, which of course is the same as the plane of the tops of the main rails of the track when the car is in use, the clearance between the lower edge of the apron 36 and the main track being as small as it can be made without rubbing against the track, for example, one-quarter of an inch or one-half of an inch. This apron effectively guards the track wheels and driving mechanism when the car is in use, without interfering with inspecting the under part of the car or repairing the car when necessary, since the entire car is of small size and may readily be turned upside down by workmen if repairs are required. The headlight 27 is conveniently mounted on the front wall of the apron 36. In addition to constituting a guard, the apron 36 also gives a pleasing finish and appearance to the car, since it entirely surrounds the main frame 10 of the car. This permits the frame 10 to be made in any manner that is most conducive to strength and the effective operation of the car, with no regard for appearance, while the apron 36 may be designed and constructed largely from the standpoint of appearance since it is not involved in supporting or driving the car.

Around the edge of the platform 16 and projecting above its upper surface, I provide a ledge 37, for example from one to two inches high, which if no car body is used, aids in retaining the driver and passengers on the car, as well as other articles that may be transported from one location to another on the miniature railway. The ledge 37 has, however, another purpose as follows: to increase the usefulness of the car, I provide it with a body 38 consisting of side walls having windows therein as indicated and a roof 39 extending a substantial distance outwardly beyond the side walls so that the overhang will provide considerable protection to the occupants of the car, if it is used in the rain. One of the side walls of the body 38, for example the back wall 38ª is preferably hinged as indicated at 40 to the adjacent side wall, so that easy entrance and exit may be had to and from the body. The outer dimensions of the side walls of the body are preferably so taken that the body is a free sliding fit inside of the ledge 37, so that all that is required in placing the body on the car is to locate it inside of the ledge 37 and resting upon the platform 16, the removal of the body being an equally simple operation. The ledge 37 effectively prevents displacement of the body on the car platform laterally in any direction, and the nature of the car and track insures against the body being jolted from engagement with the ledge 37. The windows in the body may be provided with sash to close them if desired.

In Fig. 3, I illustrate diagrammatically a closed track having main rails 41 upon which the car is indicated diagrammatically at 10ª. Between the main rails 41, an insulated third rail 42 is disposed, one of the main rails 41 and the third rail 42 being connected by wires 43 and 44 with contacts of a switch 45, the blades of which may be connected with main supply wires 46 and 47. In this manner, the operation of the car may be controlled by the switch 45 regardless of whether the switch 29 is operated or not. This affords a simple and convenient means for cutting off the entire track system from connection with the electric supply circuit, when and as desired.

While I have shown my invention in the particular embodiment above described, it will be understood that I do not limit myself to this exact construction as I may employ equivalents known to the art at the time of the filing of this application without departing from the scope of the appended claim.

What I claim is:

In a miniature car having a frame, axles and track wheels below the frame, and a platform on the frame, the combination of a continuous apron around the edge of said platform and extending both above and below said platform, the portion of said apron below said platform extending downwardly to closely adjacent tracks for said track wheels and the portion of said apron above said platform constituting a ledge projecting above and extending around said platform to removably receive within it a car body loosely resting on said platform.

In witness whereof, I hereunto subscribe my name this 29th day of January, A. D. 1929.

THOMAS S. HUTCHISON.